United States Patent [19]
Currier

[11] 4,200,025
[45] Apr. 29, 1980

[54] FOOT-OPERATED CONTROL DEVICE

[76] Inventor: George T. Currier, 2601 Gorniak Dr., Parlin, N.J. 08859

[21] Appl. No.: 887,658

[22] Filed: Mar. 17, 1978

Related U.S. Application Data

[63] Continuation-in-part of Ser. No. 825,091, Aug. 16, 1977, abandoned.

[51] Int. Cl.² .......... G01D 13/02
[52] U.S. Cl. .......... 84/422 R; 84/1.01
[58] Field of Search .......... 84/104, 229, 404, 411 R, 84/411 P, 422 R, DIG. 12, DIG. 21, DIG. 25, 1.01

[56] References Cited

U.S. PATENT DOCUMENTS

| | | | |
|---|---|---|---|
| 1,343,164 | 6/1920 | Smith | 84/422 |
| 2,313,313 | 3/1943 | Bascom | 84/404 |
| 3,008,367 | 11/1961 | Parsons | 84/411 R X |

FOREIGN PATENT DOCUMENTS

| | | | |
|---|---|---|---|
| 597169 | 5/1960 | Canada | 84/422 |

*Primary Examiner*—Lawrence R. Franklin
*Attorney, Agent, or Firm*—Lerner, David, Littenberg & Samuel

[57] ABSTRACT

A foot-operated control device for musical instruments includes a self-contained sounding member which can be struck by a beater pivotally attached to the device.

22 Claims, 6 Drawing Figures

FOOT-OPERATED CONTROL DEVICE

CROSS-REFERENCE TO RELATED APPLICATION

This is a continuation-in-part of application Ser. No. 825,091, filed Aug. 16, 1977, now abandoned.

FIELD OF THE INVENTION

The present invention relates essentially to a footoperated control device for playing musical instruments, and, more particularly, to a unique foot-operated control device which may be used in a system for producing electronically synthesized percussion instrument sounds, especially those of a drum.

BACKGROUND OF THE INVENTION

Musical sounds produced by percussion instruments are initiated by forcibly striking a sounding member. The sounding member may be either of two basic types: a membrane, under tension, which can be associated with a hollow cavity capable of influencing the frequency of vibration, as in a drum; or a rigid bar vibrating transversely, whose frequency is affected only slightly by any resonator that may be attached, as in a xylophone.

In many of the percussion instruments, the sounding member is struck by a beater, e.g., a drumstick, adapted to be held in the hand of a musician. Foot-operated beaters have been developed for various types of percussion instruments, so that the musician's hands are free to simultaneously play another instrument.

These foot-operated beaters are most commonly used with drums, especially bass drums. Conventional foot-operated drum beaters have a foot pedal mounted for pivotable movement about a pivot axis on a base member. Depression of the foot pedal actuates a drumstick which pivots about another pivot axis on the base member and strikes an adjacent drum head. Because the drum and beater must be positioned near the musician, they sometimes interfere with his playing of other instruments, due mainly to the size of the drum.

In the past, this particular problem has been overcome by locating the foot pedal remote from a beater assembly. Locating the foot pedal remote from the beater assembly is disadvantageous for at least two reasons. First, a complicated and costly assembly for connecting the foot pedal to the beater assembly must be provided. Second, because standard-sized drums are used in combination with the remotely operated drum beaters, a large amount of space is taken up by the drum and beater combination, thereby restricting the movement of the musician and limiting the space for other instruments and related equipment, such as amplifiers.

SUMMARY OF THE INVENTION

The present invention avoids all the problems and disadvantages of the prior art devices discussed above by providing a novel and improved foot-operated control device for musical instruments which normally includes a base, a foot pedal and a beater which pivots to strike a sounding member in response to the pivotal movement of the foot pedal. In accordance with the improvement, the sounding member is housed in the base to form a compact, space-saving unit. Besides saving space, the reduced size of the device also saves in material, shipping and handling costs.

In one embodiment, the beater pivots in the same arcuate direction as the foot pedal, the sounding member being mounted in a substantially vertical position between the pivot axis of the beater and an adjacent end of the base. The device, in accordance with another embodiment, can be made more compact and therefore more economical to manufacture by designing the beater to pivot in one arcuate direction upon the pivoting of the foot pedal in an opposite arcuate direction, the sounding member being positioned substantially below the foot pedal between its pivot axis and the pivot axis of the beater.

Both embodiments permit a substantially standard-sized drumstick, as compared with a miniature or substandard-sized drumstick, to be used as the beater, while maintaining an acceptable compactness of the device. The substantially standard-sized beater allows the device to have a "feel" comparable to conventional foot-operated drum beaters. The "feel" of the device is very important, inasmuch as it is depended upon by the musician to provide sensitive, uniform and non-strenuous playing conditions. Such "feel" is difficult to obtain when utilizing beaters that are considerably smaller than the standard size.

A return system which includes a spring or springs designed to bias the beater and foot pedal into respective rest positions, also contributes to the "feel" of the device. The return system may be designed such that the rate of spring tensioning is greater when the beater is traveling from its rest position away from the sounding member than when the beater is traveling from its rest position towards the sounding member.

The sounding member can be made as small as necessary to fit within the base of the device. Despite the reduced size of the sounding member, it can be used for producing sounds similar to those generated by larger sounding members, e.g., the head of a bass drum, by using a vibration pickup to generate an electric signal directly from the vibration of the sounding member, the signal being modified electronically before its radiation as synthesized sound from a loudspeaker.

BRIEF DESCRIPTION OF THE DRAWING

For a better understanding of the invention, reference may be made to the following description of two exemplary embodiments, taken in conjunction with the figures of the accompanying drawing, in which.

DESCRIPTION OF TWO EXEMPLARY EMBODIMENTS

Figure 1:
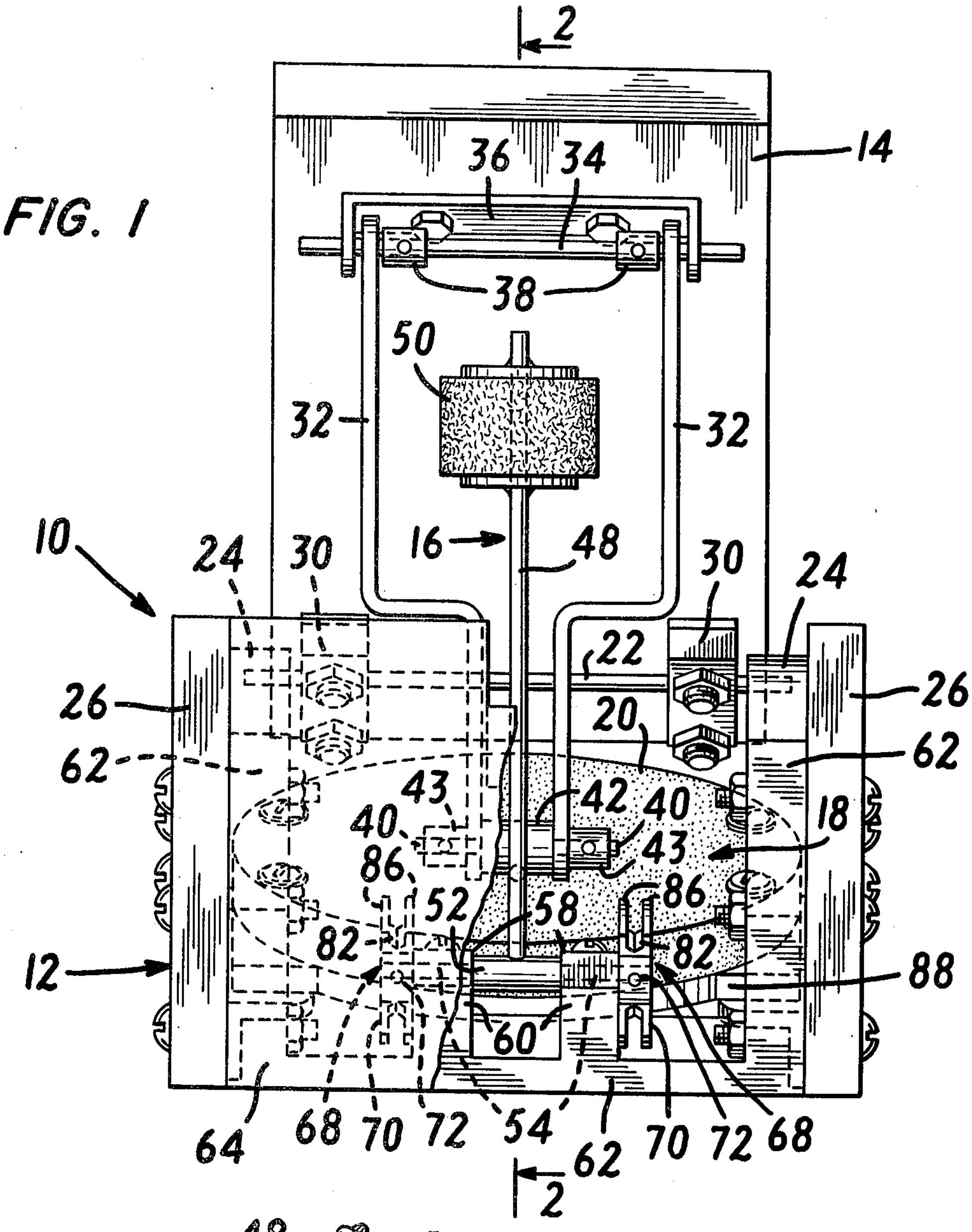
FIG. 1 is a front elevational view, partially cut away, of one embodiment of a foot-operated control device constructed in accordance with the present invention.
Figure 3:
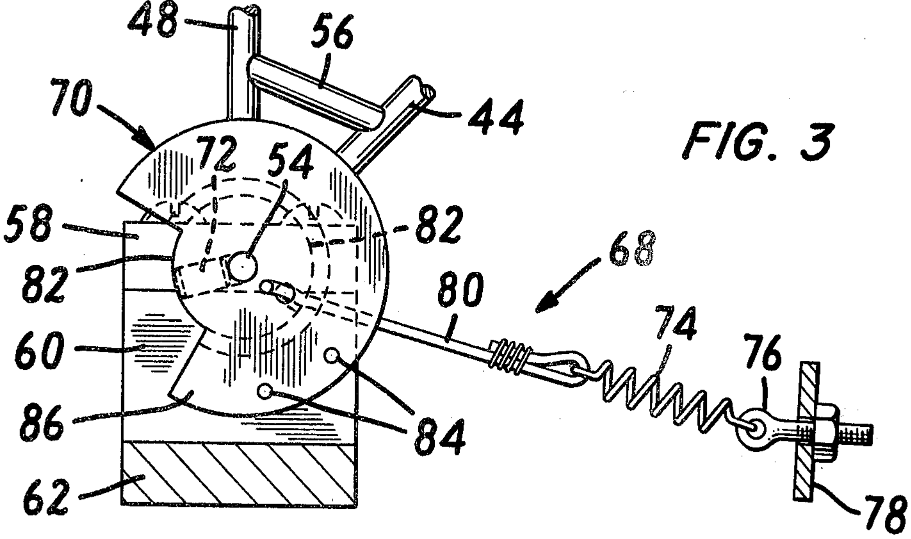
FIG. 3 is a side elevational view showing, in greater detail, a return system utilized in the foot-operated control device of FIGS. 1 and 2.
Figure 2:
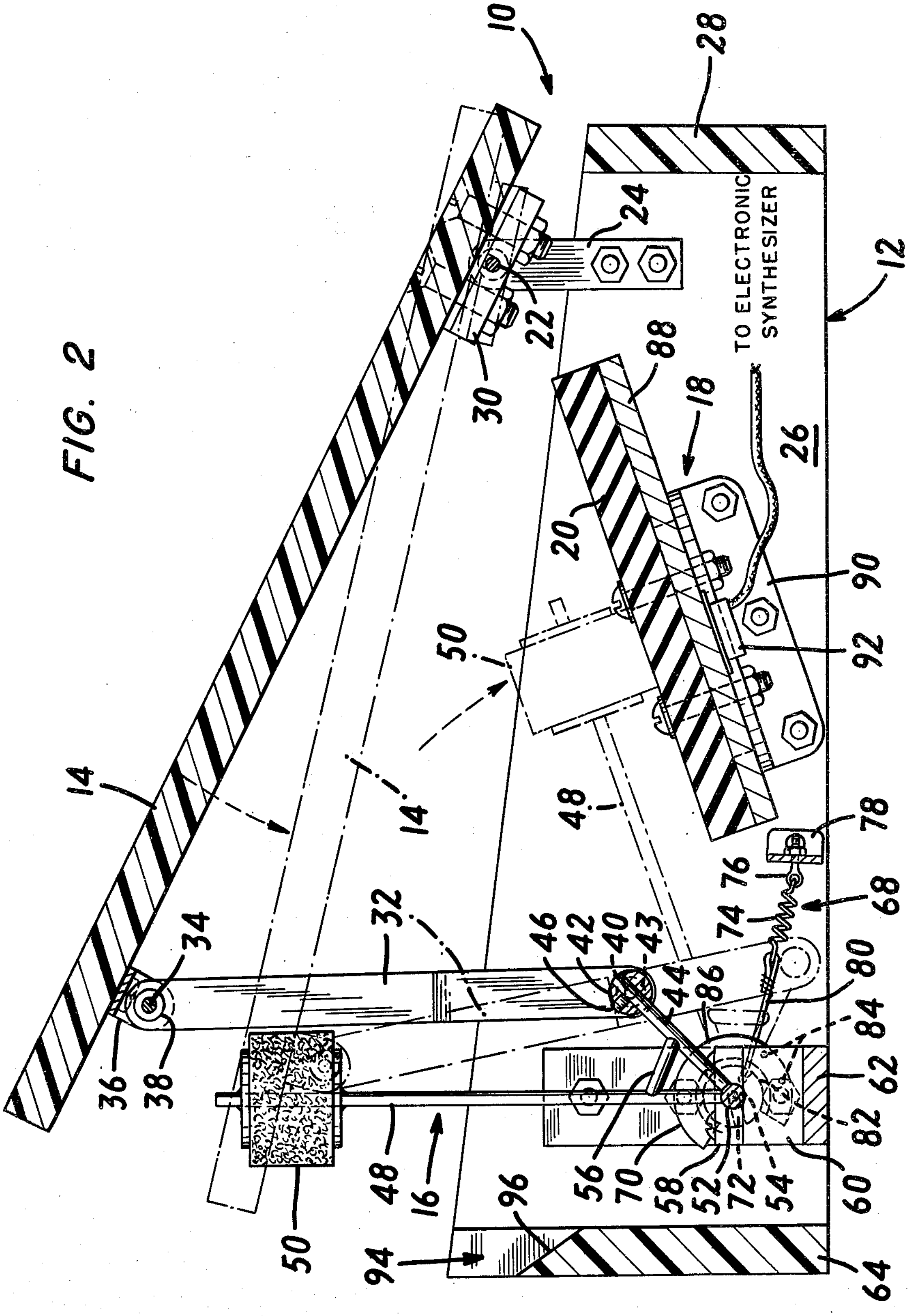
FIG. 2 is a cross-sectional view, taken along the line 2—2 of FIG. 1 and looking in the direction of the arrows, of the foot-operated control device of FIG. 1.

Referring to FIGS. 1–3, there is shown a portable foot-operated control device 10 constructed in accordance with the present invention. In particular, the device 10 includes a base 12, a foot pedal 14, a beater assembly 16, and a support assembly 18 for mounting a sounding member 20.

The foot pedal 14 pivots about a pivot pin 22, which extends transversely above the base 12 between a pair of brackets 24, 24, each bracket being attached to a respective one of two side walls 26, 26 of the base 12 near its rear wall 28. Another pair of brackets 30, 30 attached to the bottom surface of the foot pedal 14 pivotally mounts the foot pedal 14 on the pivot pin 22. As shown in FIGS. 1 and 2, the foot pedal 14 has a rectangular shape, although it can be made in the shape of a foot or shoe. The foot pedal 14 is preferably made of any durable, lightweight material, such as plastic. If additional support is desired, the foot pedal 14 may be mounted in a frame (not shown), made preferably of aluminum or some other lightweight metal. In the event that the shoe or foot of the musician slips on the foot pedal 14, the top surface of the foot pedal 14 can be roughened or covered with a frictional type material in order to give the frictional resistance required to keep the foot or shoe of the musician in place while depressing the foot pedal 14.

A pair of spaced-apart link members 32, 32 is pivotally attached at the upper ends of the link members 32, 32 to a pivot pin 34 mounted from an inverted U-shaped bracket 36 located generally at the free end of the foot pedal 14. Retainers 38, 38 fixed on the pivot pin 34 maintain the minimum spacing between the upper ends of the link members 32, 32. The lower end of each of the link members 32, 32 is pivotally attached to a respective one of two pivot pins 40, 40 extending axially from a cylindrical spacer element 42 which maintains the minimum spacing between the lower ends of the link members 32, 32. Two retainers 43, 43, one for each of the pivot pins 40, 40, secure the lower ends of the link members to the pivot pins 40, 40. The spacer element 42 is diametrically bored, so that it can receive a connecting arm 44 of the beater assembly 16. A set screw 46 received in a threaded, radially extending bore communicating with the diametrical bore in the spacer element 42 secures the connecting arm 44 to the spacer element 42.

The beater assembly 16 also includes a beater rod 48, a beater head 50 located at the upper end of the beater rod 48, an axletree 52 from which the connecting arm 44 and the beater rod 48 extend radially outwardly, and a pair of spindles 54, 54 extending axially outwardly from the axletree 52, one from each end thereof. The angle formed by the connecting arm 44 and the beater rod 48, which are connected by a brace 56 subtending the angle, may be varied to suit the particular design parameters of different devices.

To permit pivoting of the beater assembly 16, each of the spindles 54, 54 is supported in one of two journal bearings 58, 58. Each of the journal bearings 58, 58 is removably fastened to a respective one of two upwardly extending legs 60, 60 of a bracket 62 attached to the side walls 26, 26 of the base 12 near its front wall 64.

A pair of return systems 68, 68, one for each of the spindles 54, 54, is provided for biasing the foot pedal 14 and the beater assembly 16 into respective rest positions (indicated by solid lines in FIGS. 1–3). Each of the return systems 68, 68 has a spool 70 which is axially bored to receive a respective one of the spindles 54, 54. The spool 70 of each of the return systems 68, 68 is secured to its respective spindle 54 by a set screw 72 received in a threaded, radially extending bore communicating with the axial bore in the spool 70. Each of the return systems 68, 68 also has a coil spring 74, one end of which is anchored to the looped end of an eyebolt 76 threadedly received in an aperture provided in a mounting plate 78 fixedly attached to the base 12. The other end of the coil spring 74 is attached to a flexible cable 80 which is also attached to the spool 70 in such a manner that, upon the clockwise rotation of the beater assembly 16 from its rest position towards the sounding member 20, the cable 80 is wound about a hub 82 of the spool 70. When the beater assembly 16 rotates counterclockwise from its rest position away from the sounding member 20, for instance, when the beater is rebounding from the sounding member 20, the flexible cable 80 is wrapped about a pair of pins 84, 84 bridging the gap between two rims 86, 86 of the spool 70. Because the pins 84, 84 are spaced farther from the axis of rotation of the spool 70 than the circumferential surface of the hub 82, the take-up rate of the cable 80 and therefore the rate of tensioning of the coil spring 74 are greater when the beater assembly 16 pivots counterclockwise from its rest position away from the sounding member 20 than when the beater assembly 16 pivots clockwise from its rest position towards the sounding member 20.

The sounding member 20 is removably attached to a support plate 88 secured by a pair of brackets 90, 90 to the two side walls 26, 26 of the base 12. The sounding member 20 may be set at an angle so that it faces the front wall 64 of the base 12. Although the sounding member 20 is shown as a solid pad, which can be used for practice purposes, it should be understood that the sounding member 20 may be the head of a drum or a tone bar of some other percussion instrument. Furthermore, a vibration pickup 92 can be used to generate an electrical signal directly from the vibration of the sounding member 20. The signal can then be modified electrically before being radiated as synthesized musical sounds from a loudspeaker. Alternatively, the sounding member 20 may be supplemented or replaced with a device which triggers a sound generator when it is contacted by the beater assembly 16. When using such a device, the sounds produced would have characteristics independent of the vibrations of the device or the sounding member 20.

Prior to operation of the device 10, the rest positions of the foot pedal 14 and beater assembly 16 are set by adjusting the effective length of the connecting arm 44, using the set screw 46 to vary the location of the pivot axis of the lower ends of the link members 32, 32 along the length of the connecting arm 44. The rest positions of the foot pedal 14 and beater assembly 16 can also be adjusted by unscrewing the set screws 72, 72, so that the angular positions of the spools 70, 70 with respect to the spindles 54, 54 can be varied relative to the angular positions of the beater rod 48 and connecting arm 44 with respect to the spindles 54, 54. There are two basic criteria for setting the rest positions of the foot pedal 14 and the beater assembly 16. First, the beater rod 48 and the beater head 50 must pivot freely without interference from the foot pedal 14. Second, the length of travel of the beater rod 48 and the beater head 50 should be long enough to provide the musician with a "feel" sufficient to permit sensitive, uniform and non-strenuous operation of the device 10.

In operation, when a downward force is applied to the upper face of the foot pedal 14, it rotates counterclockwise about the pivot pin 22, thereby moving the link members 32, 32 downward and putting them in compression. The downward movement of the link members 32, 32 results in the clockwise rotation of the beater assembly 16, with the beater rod 48 and the beater head 50 passing through the space between the link members 32, 32. The spools 70, 70 rotate with the spindles 54, 54 of the beater assembly 16, thereby shortening the effective length of the cables 80, 80 and tensioning the coil springs 74, 74. The counterclockwise rotation of the foot pedal 14 and the clockwise rotation of the beater assembly 16 continue until the downward acting force applied to the foot pedal 14 ceases or until the beater head 50 strikes the sounding member 20 (as indicated in phantom in FIG. 2).

When the force applied to the foot pedal 4 is finally released, return systems 68, 68 return the beater assembly 16 and hence the foot pedal 14 to their respective rest positions. If the inertia of the beater assembly 16 begins to carry it past its rest position in a counterclockwise direction, the coil springs 74, 74 will again be placed in tension due to the shortening of the effective length of the cables 80, 80 by their winding about pins 84, 84 of the spools 70, 70. The coil springs 74, 74 may be preset at a desired tension by turning the eyebolt 76 to increase or decrease the static extension of the coil springs 74, 74.

The upper portion of the front wall 64 of the base 12 is provided with a slot 94 to permit passage of the beater rod 48 when the beater assembly 16 is moving in a counterclockwise direction from its rest position. A rubber stop (not shown) can be provided on the slanted base 96 of the slot 94 to cushion any impact by the beater rod 48.

Figure 4:
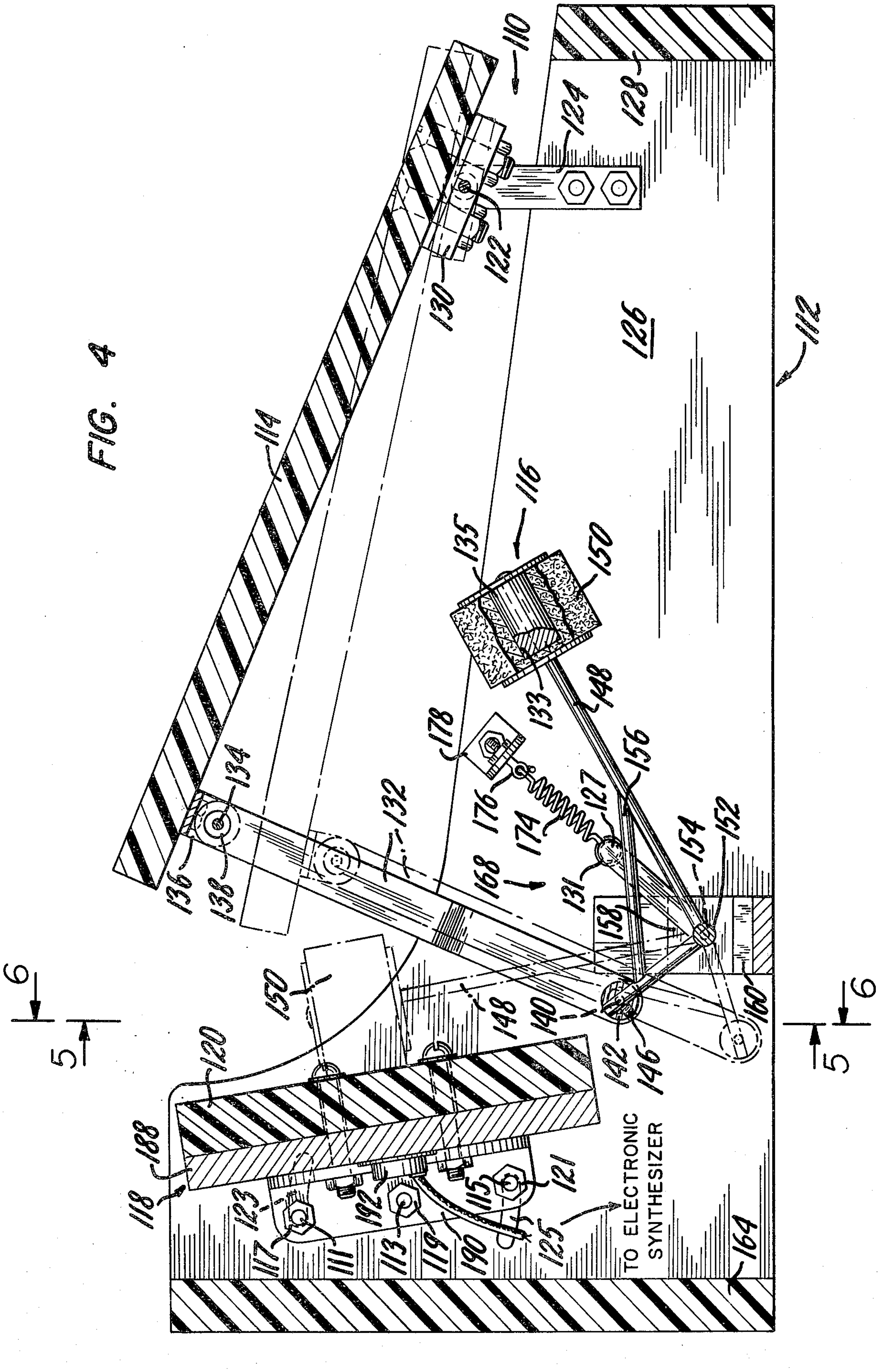
FIG. 4 is a cross-sectional view, taken along line 4—4 of FIG. 5 and looking in the direction of the arrows, of another embodiment of a foot-operated control device constructed in accordance with the present invention.
Figure 6:
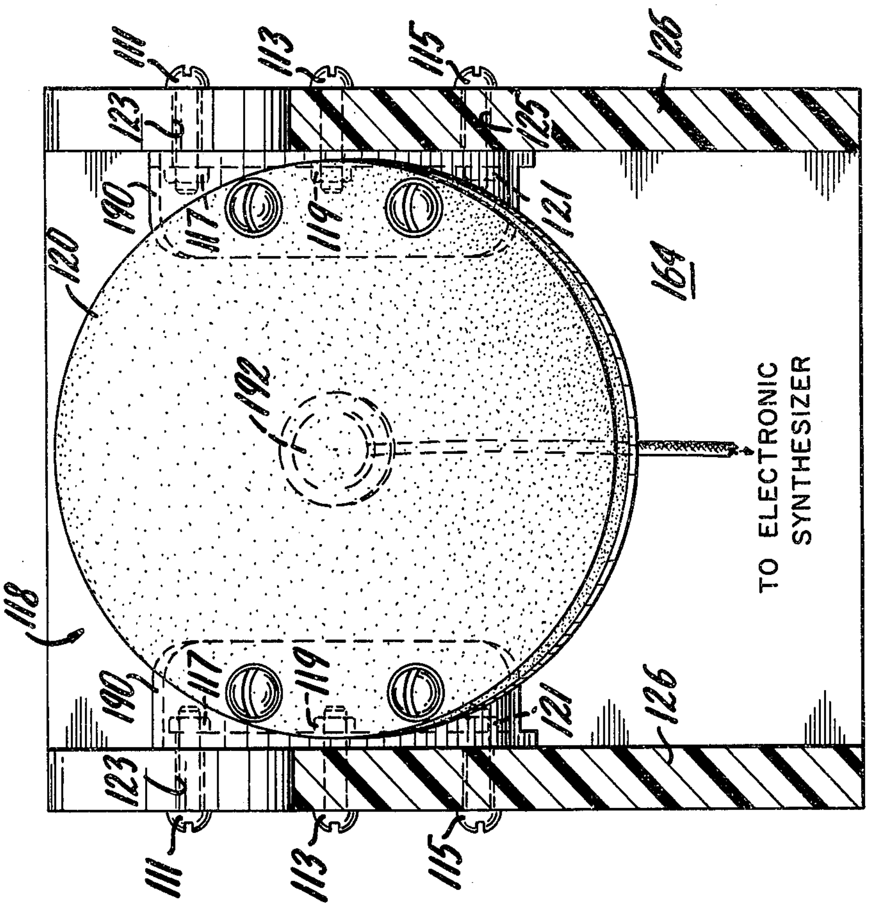
FIG. 6 is a cross-sectional view, taken along line 6—6 of FIG. 4 and looking in the direction of the arrows, of the foot-operated control device of FIG. 4.
Figure 5:
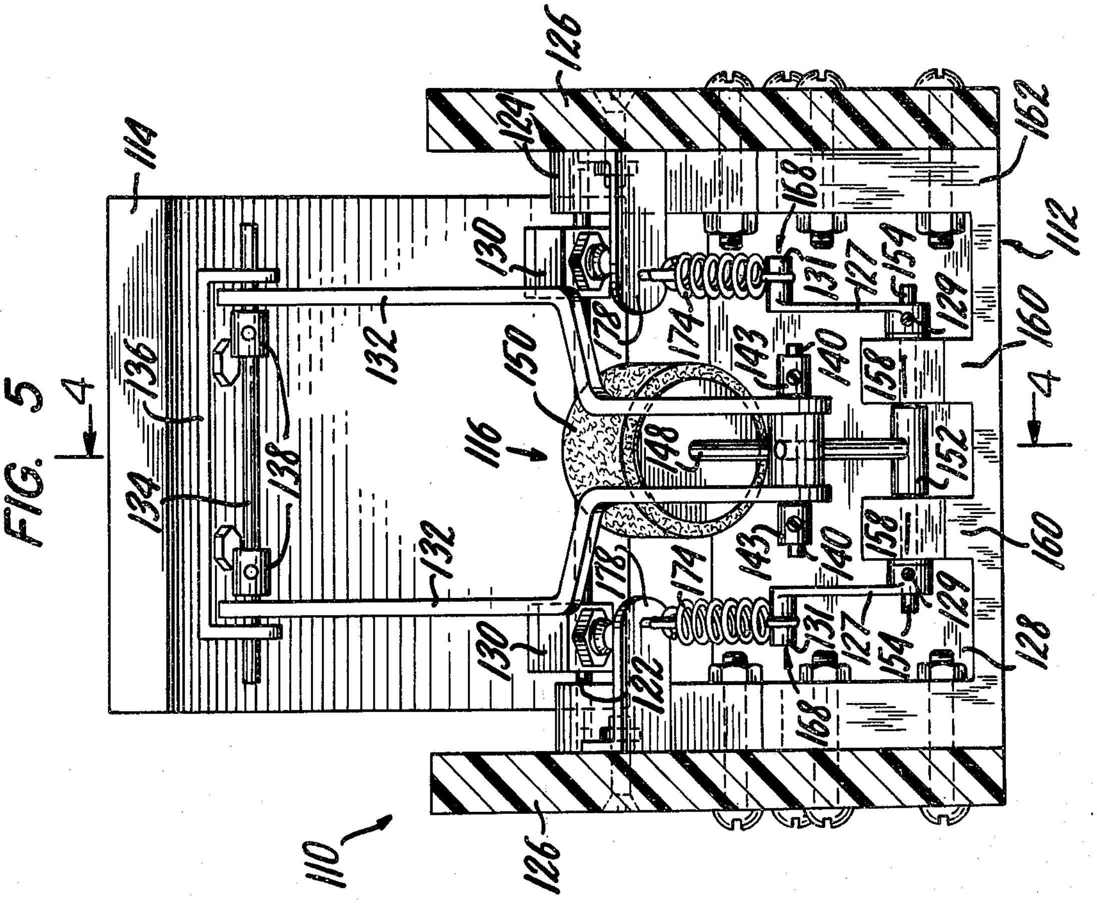
FIG. 5 is a cross-sectional view, taken along line 5—5 of FIG. 4 and looking in the direction of the arrows, of the foot-operated control device of FIG. 4.

Referring to FIGS. 4–6, there is shown another embodiment of the present invention. The various elements illustrated in FIGS. 4–6 which generally correspond to elements described above with respect to FIGS. 1–3 have been designated by corresponding reference numerals, increased by 100. Except for the specific exceptions stated, the embodiment illustrated in FIGS. 4–6 operates in the same manner as the embodiment of FIGS. 1–3.

As shown in FIG. 4, the base 112 of the foot-operated control device 110 is slightly longer than the base of the device illustrated in FIGS. 1–3, so that the sounding member 120 can be mounted between the front wall 164 of the base 112 and the pivot axis of the beater assembly 116, i.e., the axis of rotation of the spindles 154, 154 of the axletree 152. The sounding member 120 is mounted at a slight angle to the vertical, so that it diverges downwardly from the front wall 164 of the base 112.

Referring to FIGS. 4 and 6, each of the brackets 190, 190 for the support plate 188 is attached to a corresponding one of the two side walls 126, 126 of the base 112 by bolts 111, 113, 115 and their respective nuts 117, 119, 121. The bolts 111, 115, which flank the bolt 113, extend through slots 123, 125, respectively, formed in a corresponding side wall 126 of the base 112. By loosening the nuts 117, 117, 119, 119, 121, 121, the brackets 190, 190 can be rotated about a respective one of the bolts 113, 113, the bolts 111, 111, 115, 115 sliding in the slots 123, 123, 125, 125, respectively. After the sounding member 120 has been set in a desired position, which may be vertical, the nuts 117, 117, 119, 119, 121, 121 are tightened to lock the sounding member 120 in place.

The return systems 168, 168 of the embodiment of FIGS. 4–6 are not as sophisticated as those utilized in the embodiment of FIGS. 1–3, inasmuch as the rate of tensioning of the coil springs 174, 174 does not vary depending upon the direction of rotation of the beater assembly 116. In particular, each of the return systems 168, 168 includes a lever arm 127 which is keyed at one end to a respective one of the spindles 154, 154 by a set screw 129 (see FIG. 5). A connecting pin 131 extending laterally outwardly from the opposite end of the lever arm 127 engages one end of a respective one of the coil springs 174, 174, the other end being anchored to the looped end of a corresponding one of the eyebolts 176, 176 which are threadedly connected to the mounting plate 178 extending laterally across the base 112.

The beater head 150 is provided with an axial bore 133 sized to receive a weight 135 (see FIG. 4). If the weight 135 is removably received in the bore 133 of the beater head 150, various different weights can be used to selectively adjust the "feel" of the device 110.

In operation, when a downward force is applied to the upper face of the foot pedal 114, it rotates counterclockwise about the pivot pin 122, thereby moving the link members 132, 132 downward and putting them in compression. The downward movement of the link members 132, 132 results in the counterclockwise rotation of the beater assembly 116, with the beater rod 148 and the beater head 150 passing through the space between the link members 132, 132. The lever arms 127, 127 rotate with the spindles 154, 154 of the beater assembly 116, thereby tensioning the coil springs 174, 174. The counterclockwise rotation of the foot pedal 114 and the beater assembly 116 continues until the downward acting force applied to the foot pedal 114 ceases or until the beater head 150 strikes the sounding member 120 (as indicated in phantom in FIG. 4). When the force applied to the foot pedal 114 is finally released, the coil springs 174, 174 return the beater assembly 116 and hence the foot pedal 114 to their respective rest positions (as indicated by solid lines in FIG. 4).

It will be understood by those skilled in the art that the above-described embodiments are meant to be merely exemplary and that they are susceptible of modification and variation without departing from the spirit and scope of the invention. For instance, although all the brackets are illustrated as being bolted to the base or foot pedal, it may be desirable to mold at least some of the brackets into the base and foot pedal to provide unitary structures. Also, the return systems employed in the embodiment of FIGS. 1–3 can be used in the embodiment of FIGS. 4–6. Therefore, the invention is not deemed to be limited except as defined in the appended claims.

I claim:

1. A portable foot-operated control device for musical instruments, comprising a base; a sounding member attached to the base; a pedal having an upper surface and a lower surface, the pedal being pivotable about a first pivot axis located on the base; a beater pivotable about a second pivot axis located on the base; and linkage means connected between the pedal and the beater for pivoting the beater towards the sounding member in response to pivoting of the pedal, the beater pivoting directly below the pedal and passing in close proximity to the lower surface of the pedal during the pivoting of the beater and the pedal.

2. A foot-operated control device according to claim 1, wherein said linkage means pivots in one arcuate direction upon pivoting of the pedal in an opposite arcuate direction.

3. A foot-operated control device according to claim 2, wherein the first pivot axis is located substantially adjacent one end of the base and the second pivot axis is located substantially adjacent the other end of the base.

4. A foot-operated control device according to claim 3, wherein the sounding member is located between the first and second pivot axes and directly below the pedal.

5. A foot-operated control device according to claim 4, wherein the beater is a drumstick.

6. A foot-operated control device according to claim 4, further comprising return means for biasing the beater and the pedal into respective rest positions.

7. A foot-operated control device according to claim 6, wherein the return means includes a spring which is tensioned when the beater and the pedal are pivoted from their respective rest positions.

8. A foot-operated control device according to claim 7, wherein the spring has a rate of spring tensioning which is greater when the beater pivots from its rest position away from the sounding member than when the beater pivots from its rest position towards the sounding member.

9. A foot-operated control device according to claim 7, wherein the tension of the spring is adjustable when the beater and the pedal are in their respective rest positions.

10. A foot-operated control device according to claim 1, wherein the pedal is a foot pedal.

11. A foot-operated control device according to claim 1 wherein the linkage means includes a first link member having one end pivotable about a third pivot axis which is fixedly positioned relative to the pedal and spaced from the first pivot axis, the other end of the first link member being pivotable about a fourth pivot axis which is fixedly positioned relative to the beater and spaced from the second pivot axis, the beater pivoting past the first link member during the pivoting of the beater.

12. A foot-operated control device according to claim 11, wherein said linkage means further comprises a second link member having one end pivotable about the third pivot axis and another end pivotable about the fourth pivot axis, the beater pivoting between the first and second link members.

13. A foot-operated control device according to claim 1, further comprising means for transforming sounding member vibrations into electronically synthesized sounds.

14. A foot-operated control device according to claim 1, further comprising generating means, triggered by impacts of the beater means upon the sounding member, for producing electronically synthesized sounds.

15. A foot-operated control device according to claim 1, wherein said linkage means pivots the beater in one arcuate direction upon pivoting of the pedal in the same arcuate direction.

16. A foot-operated control device according to claim 15, wherein the second pivot axis is spaced a distance from one end of the base and the first pivot axis is located substantially adjacent the other end of the base.

17. A foot-operated control device according to claim 16, wherein the sounding member is located generally between the one end of the base and the second pivot axis.

18. A foot-operated control device according to claim 17, wherein the longitudinal axis of the sounding member is substantially vertical.

19. A foot-operated control device according to claim 17, wherein the sounding member is located generally below the pedal.

20. A foot-operated control device according to claim 1, wherein the beater includes a beater rod having one end pivotable about the second pivot axis and a beater head located on the other end of the beater rod, the beater head being a cylindrical member having a bore for receiving a weight.

21. A foot-operated control device according to claim 20, wherein the weight is removably received in the bore of the beater head.

22. A foot-operated control device according to claim 1, wherein the sounding member is housed within the base.

* * * * *